(12) United States Patent
Sethi et al.

(10) Patent No.: US 12,253,933 B2
(45) Date of Patent: Mar. 18, 2025

(54) PREDICTIVE LOAD DRIVEN PROACTIVE PRE-FLIGHT CHECK FOR APPLICATIONS

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/994,849

(22) Filed: Nov. 28, 2022

(65) Prior Publication Data
US 2024/0176723 A1  May 30, 2024

(51) Int. Cl.
*G06F 9/44* (2018.01)
*G06F 9/445* (2018.01)
*G06F 9/455* (2018.01)
*G06F 11/3604* (2025.01)

(52) U.S. Cl.
CPC ................ *G06F 11/3612* (2013.01)

(58) Field of Classification Search
CPC .................................................. G06F 11/3612
See application file for complete search history.

(56) References Cited

U.S. PATENT DOCUMENTS

| | | |
|---|---|---|
| 6,105,035 A | 8/2000 | Monge |
| 6,195,760 B1 | 2/2001 | Chung et al. |
| 6,393,480 B1 | 5/2002 | Qin |
| 6,563,836 B1 | 5/2003 | Capps |
| 7,251,745 B2 | 7/2007 | Koch et al. |
| 7,401,248 B2 | 7/2008 | Nakahara et al. |
| 7,525,749 B2 | 4/2009 | Maejima et al. |

(Continued)

FOREIGN PATENT DOCUMENTS

| | | | |
|---|---|---|---|
| CN | 106649091 A | * 5/2017 | .......... G06F 11/3604 |
| WO | 2021122516 A1 | 6/2021 | |
| WO | 2022104396 A1 | 5/2022 | |

OTHER PUBLICATIONS

Steven D. Young, In-Time Safety Assurance Systems for Emerging Autonomous Flight Operations, 2018, pp. 1-10. https://ieeexplore.ieee.org/stamp/stamp.jsp?tp=&arnumber=8569689 (Year: 2018).*

(Continued)

*Primary Examiner* — Mongbao Nguyen
(74) *Attorney, Agent, or Firm* — Chamberlain, Hrdlicka, White, Williams & Aughtry; Aly Z. Dossa (57) ABSTRACT

Embodiments described herein relate to methods, systems, and non-transitory computer readable mediums storing instructions for performing a connection test prior to bringing an application on-line. The method determines a best time to perform a connection test on an application that is currently off-line and at that time performs the connection test. The connection test is performed between the first application and those applications and components to which it is related. The connection test establishes whether prior to bringing the application on-line, for example after a migration, the connections between it and all the applications and components that are related to it have been re-established with performance within a predetermined threshold.

13 Claims, 6 Drawing Sheets

(56) References Cited

U.S. PATENT DOCUMENTS

| | | |
|---|---|---|
| 7,590,981 B2 | 9/2009 | Gupta et al. |
| 7,966,391 B2 | 6/2011 | Anderson et al. |
| 8,078,448 B1 | 12/2011 | Wohlberg et al. |
| 8,364,799 B2 | 1/2013 | Sakai |
| 8,918,673 B1 | 12/2014 | Rangaiah et al. |
| 9,015,832 B1 | 4/2015 | Lachwani et al. |
| 9,026,260 B1 | 5/2015 | Thornley et al. |
| 9,086,941 B1 | 7/2015 | Siegel |
| 9,397,930 B2 | 7/2016 | Drobinsky et al. |
| 9,417,918 B2 | 8/2016 | Chin |
| 9,514,164 B1 | 12/2016 | Matic |
| 9,515,873 B2 | 12/2016 | Anumala |
| 9,900,215 B2 | 2/2018 | Yang et al. |
| 10,303,465 B1 | 5/2019 | Potter |
| 10,785,123 B2 | 9/2020 | Gonguet |
| 11,392,402 B1 | 7/2022 | Carroll |
| 11,424,989 B2 | 8/2022 | Jeuk et al. |
| 11,588,893 B1 | 2/2023 | Sharma |
| 11,595,269 B1 | 2/2023 | Ghosh et al. |
| 11,846,918 B1 | 12/2023 | Mazur |
| 2002/0095474 A1 | 7/2002 | Boys |
| 2002/0138226 A1 | 9/2002 | Doane |
| 2003/0233230 A1 | 12/2003 | Ammicht |
| 2003/0236819 A1 | 12/2003 | Greubel |
| 2005/0216800 A1 | 9/2005 | Bicknell et al. |
| 2005/0257090 A1 | 11/2005 | Santos |
| 2006/0031842 A1 | 2/2006 | Neiman |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2007/0198968 A1 | 8/2007 | Shenfield |
| 2008/0222218 A1 | 9/2008 | Richards et al. |
| 2009/0307522 A1 | 12/2009 | Olson et al. |
| 2011/0087672 A1 | 4/2011 | Hui |
| 2011/0113224 A1 | 5/2011 | Isshiki et al. |
| 2011/0251998 A1 | 10/2011 | Moore |
| 2011/0307903 A1 | 12/2011 | Vaddagiri |
| 2012/0054581 A1 | 3/2012 | Grube |
| 2012/0072571 A1 | 3/2012 | Orzell et al. |
| 2012/0089711 A1 | 4/2012 | Zager |
| 2012/0151061 A1 | 6/2012 | Bartfai-walcott |
| 2012/0254849 A1 | 10/2012 | Wang |
| 2013/0103977 A1 | 4/2013 | Zimmermann |
| 2013/0346714 A1 | 12/2013 | Solihin |
| 2014/0172782 A1 | 6/2014 | Schuenzel |
| 2014/0376385 A1 | 12/2014 | Boss et al. |
| 2015/0169329 A1 | 6/2015 | Barrat |
| 2015/0222702 A1 | 8/2015 | Salle |
| 2015/0261518 A1 | 9/2015 | Viswanathan |
| 2015/0278219 A1 | 10/2015 | Phipps |
| 2015/0347573 A1 | 12/2015 | Hosokawa |
| 2016/0162280 A1 | 6/2016 | Murayama et al. |
| 2016/0239395 A1 | 8/2016 | Madsen et al. |
| 2016/0266875 A1 | 9/2016 | Takahashi |
| 2016/0378648 A1* | 12/2016 | Ekambaram ............ G06F 11/00 714/38.1 |
| 2017/0046202 A1 | 2/2017 | Bao |
| 2017/0337088 A1 | 11/2017 | Wang |
| 2018/0074855 A1 | 3/2018 | Kambatla |
| 2018/0113728 A1 | 4/2018 | Musani et al. |
| 2018/0152341 A1 | 5/2018 | Maeda et al. |
| 2018/0157723 A1 | 6/2018 | Chougule |
| 2018/0262979 A1 | 9/2018 | Wang et al. |
| 2018/0322276 A1 | 11/2018 | Brown |
| 2019/0087224 A1 | 3/2019 | Vrind |
| 2019/0104019 A1 | 4/2019 | Makovsky |
| 2019/0199687 A1 | 6/2019 | Lan |
| 2019/0310872 A1 | 10/2019 | Griffin |
| 2019/0311041 A1 | 10/2019 | Shah |
| 2019/0379595 A1 | 12/2019 | Ur et al. |
| 2020/0099773 A1* | 3/2020 | Myers .................... H04L 67/34 |
| 2020/0104113 A1 | 4/2020 | Grill et al. |
| 2020/0110655 A1 | 4/2020 | Harwood et al. |
| 2020/0133772 A1 | 4/2020 | Dalmatov et al. |
| 2020/0156243 A1 | 5/2020 | Ghare et al. |
| 2020/0169921 A1 | 5/2020 | Zhu |
| 2020/0264930 A1 | 8/2020 | Mandagere et al. |
| 2020/0344658 A1* | 10/2020 | Huang .................. H04W 36/22 |
| 2020/0349238 A1 | 11/2020 | Tyagi |
| 2021/0064401 A1* | 3/2021 | Vichare ............... G06F 9/44505 |
| 2021/0153044 A1 | 5/2021 | Ramanathan et al. |
| 2021/0165768 A1 | 6/2021 | D'halluin et al. |
| 2021/0200814 A1 | 7/2021 | Tal |
| 2021/0373947 A1 | 12/2021 | Kweon |
| 2022/0070648 A1 | 3/2022 | Krishan |
| 2022/0075613 A1 | 3/2022 | Ramachandran |
| 2022/0091980 A1 | 3/2022 | Kayiran |
| 2022/0138081 A1 | 5/2022 | Varma et al. |
| 2022/0158926 A1 | 5/2022 | Wennerström et al. |
| 2022/0164186 A1 | 5/2022 | Pamidala |
| 2022/0167363 A1 | 5/2022 | Sun |
| 2022/0171856 A1 | 6/2022 | Bhatt |
| 2022/0179683 A1 | 6/2022 | Verma et al. |
| 2022/0229573 A1* | 7/2022 | Ramasamy ............. G06F 3/061 |
| 2022/0240105 A1* | 7/2022 | Shaw .................... H04W 24/10 |
| 2022/0272142 A1 | 8/2022 | Li et al. |
| 2022/0283784 A1 | 9/2022 | Degen et al. |
| 2022/0337493 A1 | 10/2022 | Sant et al. |
| 2022/0337501 A1 | 10/2022 | Sant et al. |
| 2022/0342697 A1* | 10/2022 | MacFarlane ........ G06F 11/3612 |
| 2022/0368602 A1 | 11/2022 | Adhav et al. |
| 2022/0413845 A1* | 12/2022 | Mathew ............. G06F 11/3452 |
| 2023/0033886 A1 | 2/2023 | Goswami et al. |
| 2023/0037124 A1 | 2/2023 | Mengwasser et al. |
| 2023/0080047 A1 | 3/2023 | Bashir |
| 2024/0037011 A1* | 2/2024 | Zheng ................. G06F 11/3664 |

OTHER PUBLICATIONS

Pan, Jia-xu (CN 106649091 A1), 2017, pp. 1-14 (Year: 2017).*

Mona Elsaadawy, Enabling efficient application monitoring in cloud data centers using SDN, 2019, pages chrome-extension:// efaidnbmnnnibpcajpcglclefindmkaj/https://arxiv.org/pdf/1902. 11292 (Year: 2019).*

Wu, Suzhen et al., Proactive Data Migration for Improved Storage Availability in Large-Scale Dat Centers, Sep. 2015, IEEE (15 pages).

* cited by examiner

PREDICTIVE LOAD DRIVEN PROACTIVE PRE-FLIGHT CHECK FOR APPLICATIONS

BACKGROUND

Computing devices often exist in environments that include many devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require copious amounts of investigation, coordination, time, and manual steps to be performed by any number of system administrators. When a migration is performed, the application must be taken off-line, this may affect other applications that are dependent on it to function or obtain data.

SUMMARY

In general, embodiments described herein relate to a method for verifying that an application is active. After migrating an application, the method begins by identifying at least one application that is related to the application that was migrated. The method then determines an optimal time for performing a connection test between the application and the at least one application that is related to the application. Once the optimal time is determined the connection test is performed during the optimal time. If the connection test fails, the method alerts a user.

In general, embodiments described herein relate to a non-transitory computer readable medium comprising computer readable program code. The computer readable code, which when executed by a computer processor, enables the computer processor to perform a method for verifying that an application is active. After migrating an application, the method begins by identifying at least one application that is related to the application that was migrated. The method then determines an optimal time for performing a connection test between the application and the at least one application that is related to the application. Once the optimal time is determined the connection test is performed during the optimal time. If the connection test fails, the method alerts a user.

In general, embodiments described herein relate to a production host, which hosts a plurality of applications. The production host comprises at least one processor, a storage device, and at least one memory. The memory includes instructions, which when executed by the processor perform a method for verifying that an application is active. After migrating an application, the method begins by identifying at least one application that is related to the application that was migrated. The method then determines an optimal time for performing a connection test between the application and the at least one application that is related to the application. Once the optimal time is determined the connection test is performed during the optimal time. If the connection test fails, the method alerts a user.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

In the below description, numerous details are set forth as examples of embodiments described herein. It will be understood by those skilled in the art and having the benefit of this Detailed Description that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regards to a figure, in various embodiments described herein, may be equivalent to one or more like-named components described with regard to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection.

Thus, any path through which information may travel may be considered an operative connection.

In general, embodiments described herein relate to methods, systems, and non-transitory computer readable mediums storing instructions for performing a connection test prior to bringing an application on-line. The method determines a best time to perform a connection test on an application that is currently off-line and at that time performs the connection test. The connection test is performed between the first application and those applications and components to which it is related. The connection test establishes whether prior to bringing the application on-line, for example, after a migration, that the connections between it and all the applications and components that are related to it have been re-established with performance within a predetermined threshold.

While primarily described as being performed on applications after being migrated, one or more embodiments of the invention are not limited to applications that are being migrated and may be related to any aspects of an information handling system comprising of one or more servers and other computing devices being migrated, that affects the functioning of other applications and/or aspects of one or more other components of the information handling system and/or other information handling systems.

Figure 1:
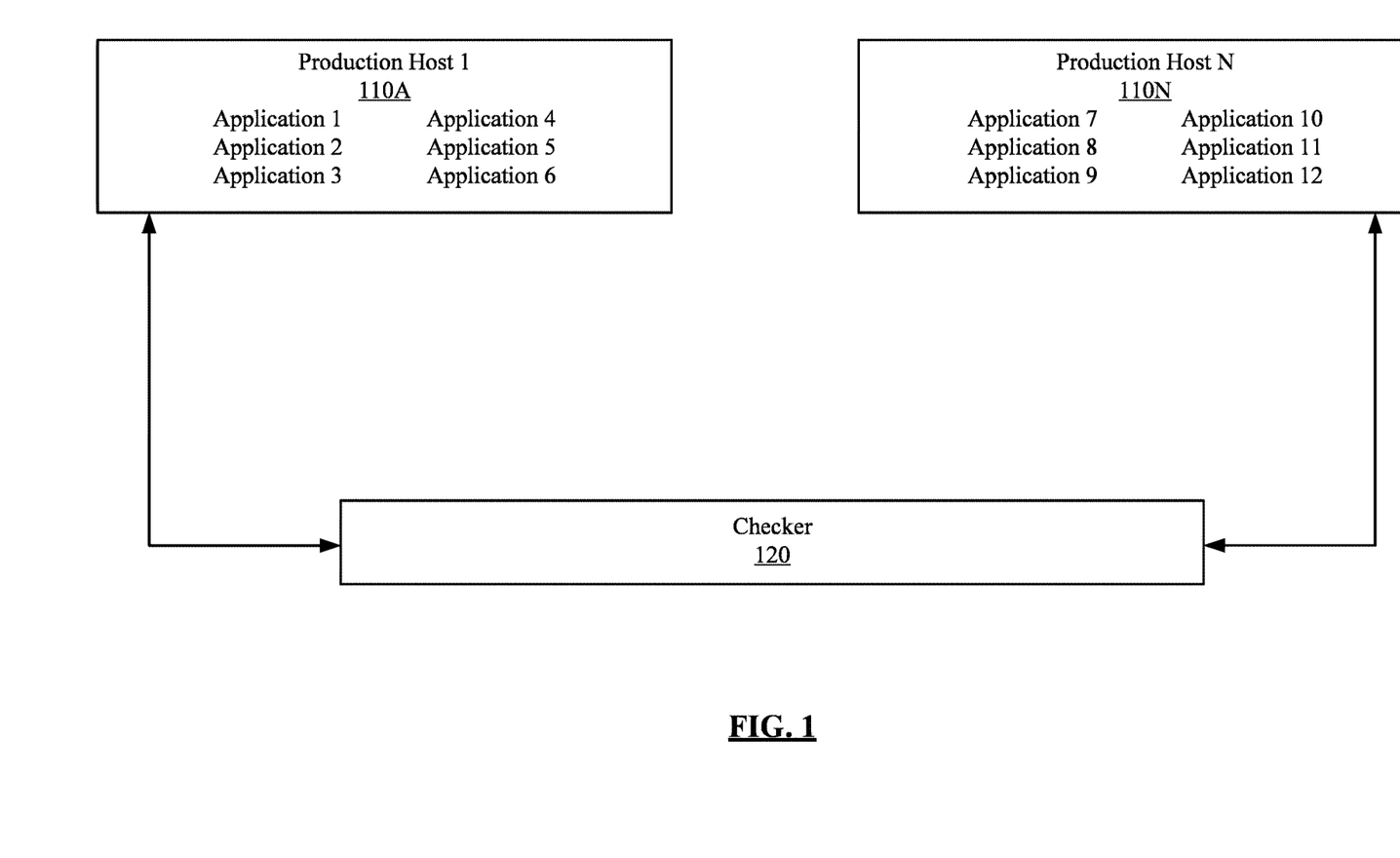
FIG. 1 shows a diagram of a system in accordance with one or more embodiments of the invention.

FIG. 1 shows a diagram of a system that performs the claimed methods in one or more embodiments of the invention. The system includes a plurality of production hosts (110A and 110N) and a checker (120) in accordance with one or more embodiments described herein. For simplicity, the system shown in FIG. 1 only shows two production hosts (110A and 110N), however, they are only representative and a subset of the system.

In one or more embodiments of the invention, one or more applications (e.g., applications 1-12) are hosted by the production hosts (e.g., 110A-110N). These applications, in one or more embodiments of the invention, perform computer implemented services for clients (not shown). Performing the computer implemented services may include performing operations on assets (applications related data or other data) that are stored in virtual storage devices that are either part of the production host or separate connected storage devices (not shown). The operations may include creating elements of assets, moving elements of assets, modifying elements of assets, deleting elements of assets, and other and/or additional operations on asset data without departing from the invention. The application(s) may include functionality for performing the aforementioned operations on the asset data in the production hosts (e.g., 110A-110N). The application(s) may be, for example, instances of databases, email servers, and/or other applications. The production hosts (e.g., 110A-110N) may host other types of applications without departing from the invention, including hosting the checker (120).

In one or more of embodiments of the invention, the applications are implemented as computer instructions, e.g., computer code, stored on a persistent storage or virtual storage devices, that when executed by a processor(s) of the production hosts cause the production hosts (e.g., 110A-110N) to provide the functionality of the application(s) described throughout this application.

The production hosts (e.g., 110A-110N) may include physical storage or logical/virtual storage (not shown). One or more of the production hosts (e.g., 110A-110N), may be externally located on a cloud or other external location. The logical storage devices may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the production hosts (e.g., 110A-110N) may host virtual machines (VMs) that host the above-discussed applications. Each of the production hosts (e.g., 110A-110N) may host any number of VMs that, in turn, host any number of applications. Each of the production hosts (e.g., 110A-110N) may host or be operatively connected to a plurality of virtual storage devices (not shown). Alternatively, in one or more embodiments of the invention the virtual storage devices may instead be physical storage devices such as hard disk drive, solid disk drive, tape drives, and or other physical storage mediums of any number of computing devices.

Figure 5:
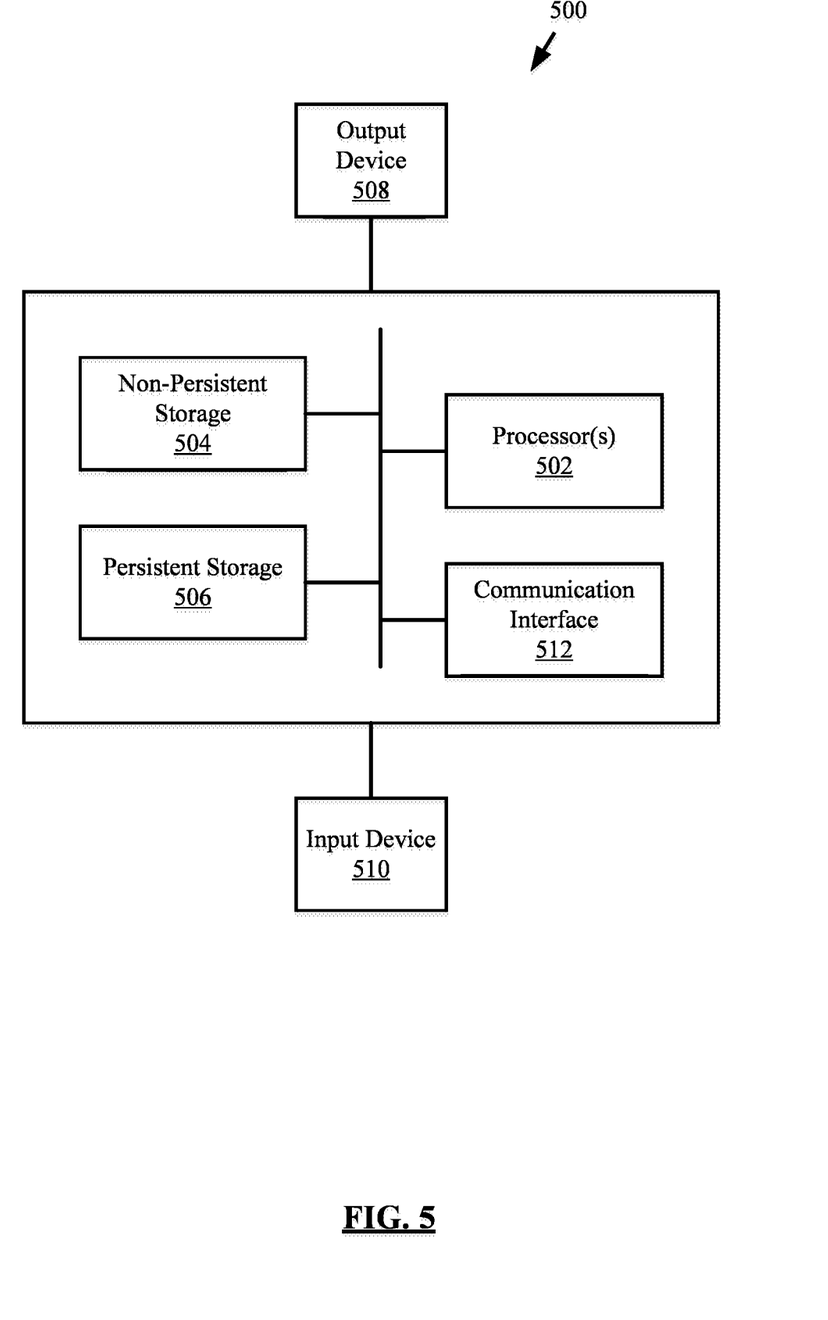
FIG. 5 shows a computing system in accordance with one or more embodiments of the invention.

In one or more embodiments of the invention, the production hosts (e.g., 110A-110N) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (e.g., 110A-110N) described throughout this application.

In one or more embodiments of the invention, the system includes a checker (120). The checker (120) performs checks on applications prior to bringing them online and at other times as needed. The applications may be parts of various production hosts (e.g., 110A-110N). In one or more embodiments of the invention, the application(s) may be offline due to being migrated from a first production host (e.g., 110A) to a second production host (e.g., 110N). The application(s) may be offline for any reason, including, but not limited to, maintenance or malfunctioning of the physical devices hosting the application(s).

The checker (120), as will be described in more detail with regards to the methods shown in FIGS. 2A-3, sends messages such as a ping to each offline application as well as any related applications or devices. The related applications or devices man be determined based on analysis of logs or configuration files, alternatively, in one or more embodiments of the invention, by an application relationship mapper (not shown).

In one or more embodiments of the invention the checker (e.g., 120) and/or application relationship mapper, determines the relationships between the application(s) that are to be tested by the checker (e.g., 120) and other applications or components of the system. Other components of the system may include, but are not limited to, storage locations, such as storage devices that contain the data for a database. The components may also include the physical computational devices that serve as hosts for the application and/or related applications.

The application(s) to be tested by the checker (e.g., 120) and the other applications and components that are related to it, are not necessarily located on the same production host (e.g., 110A) or even the same source device. The application relationship mapper or other component of the checker (120) analyzes traffic on both ports internal to the source production host (e.g., 110A) and individual production hosts (e.g., 110A-110N) and other external devices that are connected by a local network and/or Internet, such as cloud and edge environments.

The relationships between the application to be tested by the checker (e.g., 120) and the related applications and/or components of the system, in one or more embodiments of the invention, may be determined by port mapping such as looking at port mapping meta-data or the actual system internal traffic on various ports. By analyzing whether traffic on a specific port is outgoing or incoming, the relationship mapper or other equivalent structure may determine whether the application is the parent application, and which application are the children. An independent application in a system would be a parent and the dependent applications would be the children. The children or dependent applications would be considered to have an IS-A relationship with the parent.

In one or more embodiments of the invention, the application relationship mapper or similar component or system, finds multiple applications with the same system access to the same data paths and location. In this case the application relationship mapper, determines that the two applications have a HAS-A relationship. This may be determined by the application relationship mapper, by looking at meta-data for the particular data path and or a registration ID that is common to at least two applications. Other means for identifying both a HAS-A relationship and/or IS-A relationship may be used, without departing from the invention.

Returning to the checker (120), the checker (120) sends messages such as, but not limited to, a ping to the application(s) and/or the underlying physical computational devices that host them, that are to be brought online, such as those being migrated as well as any related applications and/or components of the system to determine if they are responsive. If the application and related applications and components are found to be responsive, the checker (e.g., 120) compares each application and component's response times to determine if the connections between the application(s) and related applications and/or components meets a desired level of performance.

In one or more embodiments of the invention, the checker (e.g., 120) compares the response times determined in previous messages to the application, its underlying physical computational devices that host it, related applications and their host, and other related computational devices, and the current response time to determine how much they differ. In one or more embodiments of the invention, if the difference is within a predetermined threshold such as but not limited to a percentage (for example, 5%, 10%, or any other preset percentage), then the checker (e.g., 120) may determine that the application and/or component is functioning appropriately and may be brought online and/or taken out of maintenance mode.

However, if the checker (e.g., 120) determines that one or more applications and/or components do not pass the check (a return message takes longer than a threshold period of time, or is not received at all), then the checker notifies a user, administrator and/or other appropriate entity (such as, but not limited to, an automated system for reversing a migration, a manufacturer, etc.) that the application and/or related applications and devices are not functioning appropriately. The notified entity may then perform actions to ameliorate the problem, such as, but not limited to, reversing a migration, manually placing the application online, replacing hardware, migrating the application instance to a cloud environment, or any other action as is appropriate. The checker (e.g., 120) may also provide and send any other useful information collected as appropriate for correcting the problem to the notified entity. The application(s) being checked by the checker (e.g., 120) as well as related applications and components are left in a maintenance mode and/or off-line.

In one or more embodiments of the invention, the checker (e.g., 120) performs the connection test at an optimized time, as is discussed in more detail below with regards to the methods shown in FIGS. 2A-3. In accordance with one or more embodiments of the invention, the checker (e.g., 120), or other related component, obtains log data on each of the applications, that the connection test is to be performed on, as well as those applications that have been determined to depend on the application and/or the application is dependent on. Using the log-data, the checker determines the idle times and/or reduced usage times, start times, peak usage times, and loading time of each of the applications to be tested and those applications that depend on the applications being tested. Based on these times, the checker (e.g., 120), in concert with other components of the production hosts (e.g., 110A-110N), is able to plan the best times to perform the connection test. As will be described below with regards to the methods shown in FIGS. 2A-3, the best time is calculated by determining when a need or peak usage for the applications being tested occurs. Based on this time and the amount of time it takes to load the applications being tested a best time to perform the test may be determined.

In one or more embodiments of the invention, it is desirable to perform the test in sufficient enough time before the peak usage or other time when the application is needed online, to allow the test to fail, the application or related devices to be repaired, and the application to be loaded and brought back-online.

In a non-limiting example, if a HR application is to be migrated and taken off-line on a Saturday, but it is known that that it is needed Monday morning by 9:00 AM, a connection test may be scheduled to be performed before this period. If it is known the HR application and a related database take 45 minutes to load and bring on-line, and it is assumed that an administrator would need an hour to fix any problems, the connection test could be performed on the HR application and related database (or the specific devices that host them, as well as any intermediary hops and applications), at 7:15 AM. If at 7:15 AM the checker (e.g., 120) determines that the devices hosting the HR application and related applications and a databases are performing adequately, then the HR application will be placed back-online and available to any users, however if the test determines the devices and/or the HR application and/or related applications such as the database are not functioning adequately, a user, administrator, or other concerned entity may take mitigating measures to bring them online, with the goal that they will begin loading no later than 8:15 AM. This is an example, and other time periods and goals may be used without departing from the invention.

In one or more embodiments of the invention, the checker (120) may be implemented as computing devices (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the checker (120) described throughout this application.

While FIG. 1 shows a configuration of components, other configurations may be used without departing from the scope of embodiments described herein. For example, although FIG. 1 shows all components as part of two devices, any of the components may be grouped in sets of one or more components which may exist and execute as part of any number of separate and operatively connected devices. Accordingly, embodiments disclosed herein should not be limited to the configuration of components shown in FIG. 1.

Figure 2A:
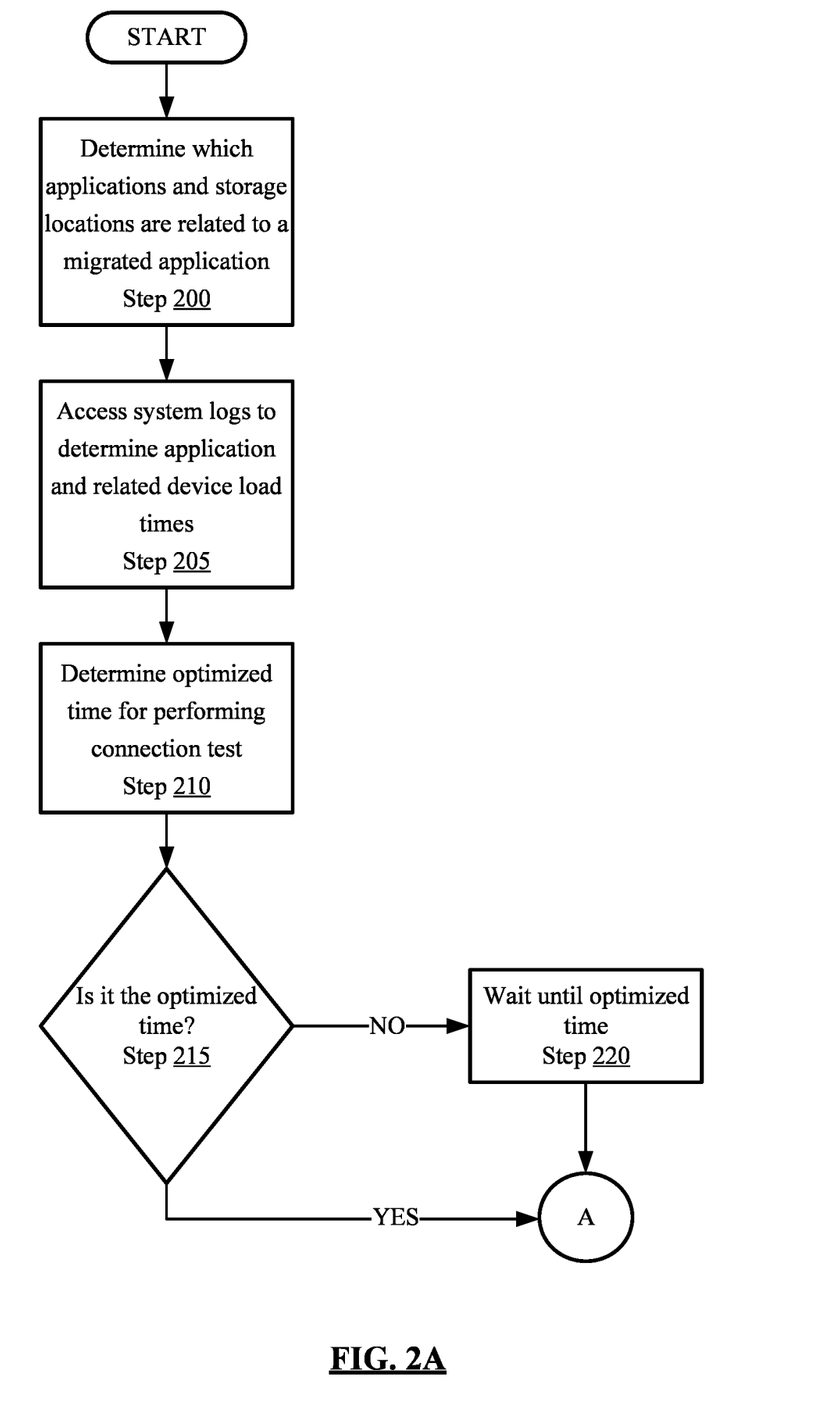
FIGS. 2A and 2B shows a flowchart of a method for determining if a previously off-line application is functioning and taking mitigating actions if not in accordance with one or more embodiments of the invention.
Figure 2B:
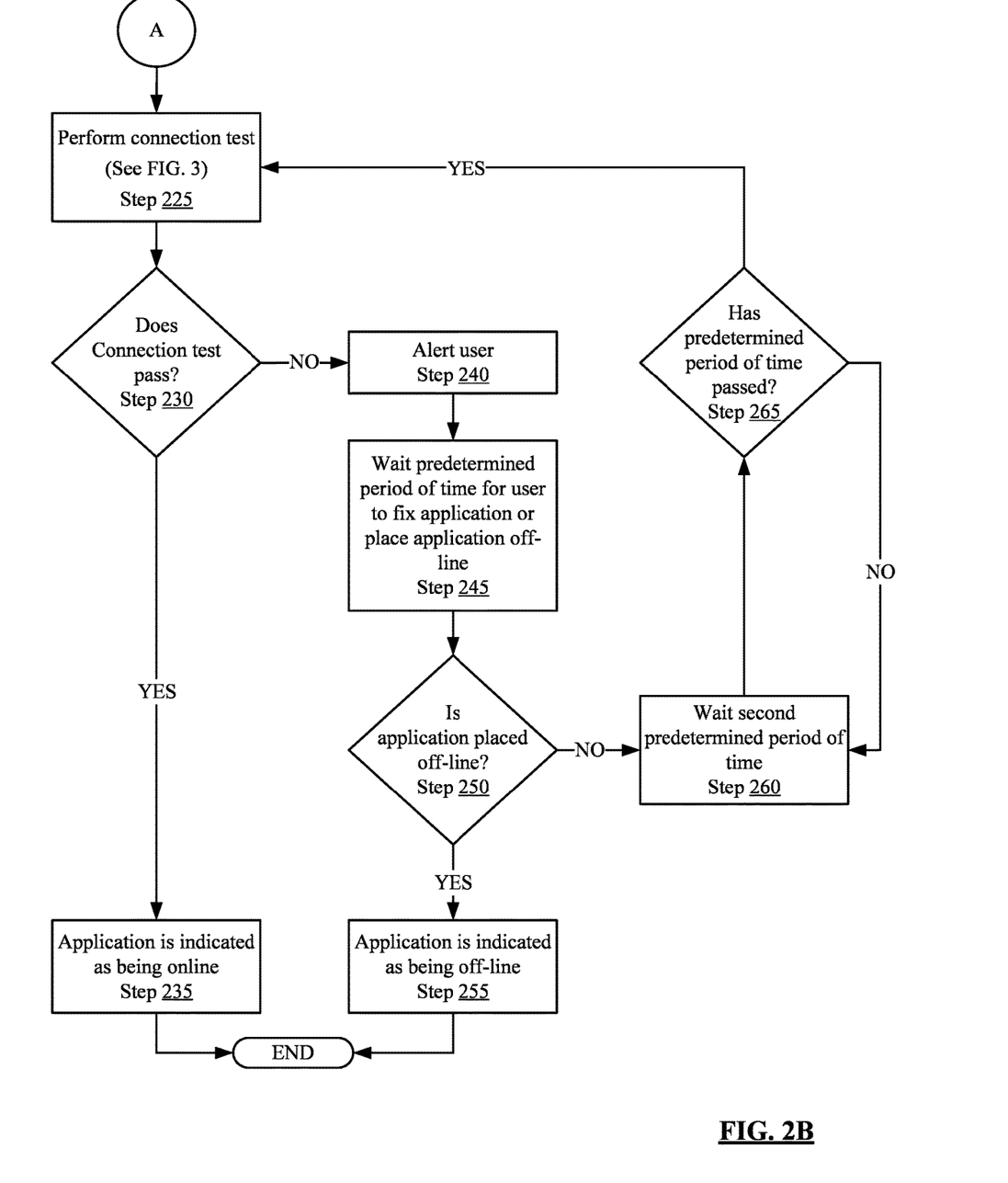

FIGS. 2A and 2B show a flowchart describing a method for performing a connection test on one or more applications that have been migrated as well as those applications and components of the one or more applications that have been migrated are dependent on. While being described as being performed after a migration, the connection test does not necessarily have to be performed on applications that have been migrated and, in one or more other embodiments of the invention, may be performed on any application that needs a connection test after having been taken offline, such as, but not limited to after maintenance has been performed on the application or the production host.

The method may be performed, for example, by the checker (e.g., 120, FIG. 1) and/or any other part of the production hosts (e.g., 110A-110N). Other components of the system, including those illustrated in FIG. 1 perform all, or a portion of the method of FIGS. 2A and 2B without departing from the invention. While the method describes the connection tests being performed on specific applications, the test may be directed towards the underlying computing devices which host the applications and not necessarily the applications themselves. While FIGS. 2A and 2B are illustrated as a series of steps, any of the steps may be omitted, performed in a different order, additional steps may be included, and/or any or all the steps may be performed in a parallel and/or partially overlapping manner without departing from the invention.

In Step 200, the method determines which applications and storage locations are related to a migrated application. Alternatively, this step may be performed on any application that has been taken off-line or placed in a maintenance mode. As described above, the checker (e.g., 120, FIG. 1) or other related component, determines related applications and components such as storage locations and network hops that the application being tested is dependent on, as well as any other related applications and/or devices that a configuration of the connection test includes.

Once the related applications and components are determined in Step 200, the method proceeds to Step 205, where the checker accesses system logs and other resources to determine such things as the application's typical load time, typical peek use or idle times, and other useful information. This information is then used in Step 210 to determine an optimized time for performing a connection test. In general, the optimized time is determined to be prior to the application receiving a normal load, in order to ensure a better experience of the majority of customers.

In one or more embodiments of the invention, the checker (e.g., 120, FIG. 1) or related component, uses the system logs to determine the history of the migrated applications as well as the related applications and associated computational devices. The checker (e.g., 120) parses the history to determine such things as their peak usage time, average load time, as well as typical repair time (looking at data such as, but not limited to, maximum ticket resolution history), where appropriate.

In one or more embodiments of the invention, the checker (e.g., 120, FIG. 1) or related component utilizes the historical information obtained from the system logs and applies a time series model to determine the optimized time to perform the connection test. The time series model can be based on the prophet algorithm or similar commonly available algorithms. The model may take as an input the average load time for the migrated application and related applications, current system status and configuration(s), historic peak and low usage times, average repair ticket resolution times, and any other data that a user, administrator, or other appropriate entity (such as, but not limited to, a manufacturer) indicates should be used in determining the optimized time. While described using a time series model, other methods for determining the optimized time may be used, including having the user input an optimized time, without departing from the invention.

Once the optimized time is determined in Step 210, the method proceeds to Step 215, where the method determines if it is the optimized time. If it is not, the method proceeds to Step 220 and waits until the optimized time before proceeding to Step 225 in FIG. 2B. Otherwise, the method proceeds directly to Step 225.

In Step 225, the checker (e.g., 120, FIG. 1), or other appropriate component of the system, performs a connection test of the application(s) (and/or underlying computing devices) that have been determined in step 200 to need a connection test performed on. In one or more embodiments, the checker (e.g., 120, FIG. 1) sends messages between each of the migrating applications and those applications/components that are related to them to determine pre-migration response times. The method of performing the connection test is described in more detail below with regards to the method shown in FIG. 3. Other methods for performing the pre-migration check may be used, and the invention is not limited to the method described in FIG. 3.

Once the checker or other appropriate component, performs the connection test, the method proceeds to Step 230, where it is determined if the connection test is passed. If the connection test is passed or successful (meaning communication has been restored between the migrated application(s) and all related application(s) and component(s) at least within a predetermined threshold of a performance level), then the method proceeds to Step 235 where the application is then indicated to be online and available to users. The method then ends after Step 235.

However, if the connection test does not pass in Step 230, the method proceeds to Step 240. In Step 240, the method alerts a user, administrator, or other concerned party. This alert, in one or more embodiments of the invention, may include sending data such as the results of the messages sent in Step 225 as well as any other useful information and/or telemetry. The user, administrator, and/or other concerned party may perform appropriate actions to ameliorate the failure so that the application that was migrated and those that are dependent on it may be restored.

The method then, in Step 245, waits a predetermined period of time to allow a user, administrator, or other entity to repair or restore connections between the application(s), such as a migrated application and/or an underlying computing device that hosts it, and its related applications and components. This predetermined period of time may be amount of time configured by a user, administrator, or manufacture when the system is initiated or manufactured.

For example, the administrator may estimate that all such repairs after a migration would potentially take one hour or other greater or lesser amount of time as appropriate. Alternatively, the checker (e.g., 120, FIG. 1) or related component may use an algorithm to determine the average amount of time that a specific problem should take to be corrected.

Once the method waits the predetermined time in Step 245, the method proceeds to Step 250, where it is determined if the application or related application/component that failed the connection test in Step 225 has been placed off-line. If it has been placed offline, for example, by an administrator, setting the application's status as offline, when the problem cannot be easily corrected, then the method proceeds to Step 255, and the application is indicated as being off-line to users and other concerned parties and the method ends.

However, in Step 250, if the application or related application/component is not indicated as having been placed off-line, the method proceeds to Step 260. In Step 260, the method waits a second predetermined period of time. This second predetermined period of time may be the remaining amount of time before an application must be brought online, or it may be some other user/administrator selected amount of time. In Step 265, it is determined if the second predetermined period of time has passed. If not, the method returns to Step 260 and continues to wait until the second predetermined period of time has passed. Once the second predetermined period of time has passed the method returns to Step 225, where a new connection test is performed, and Step 230-265 are repeated as appropriate.

The method may end after either Steps 235 or 255.

Figure 3:
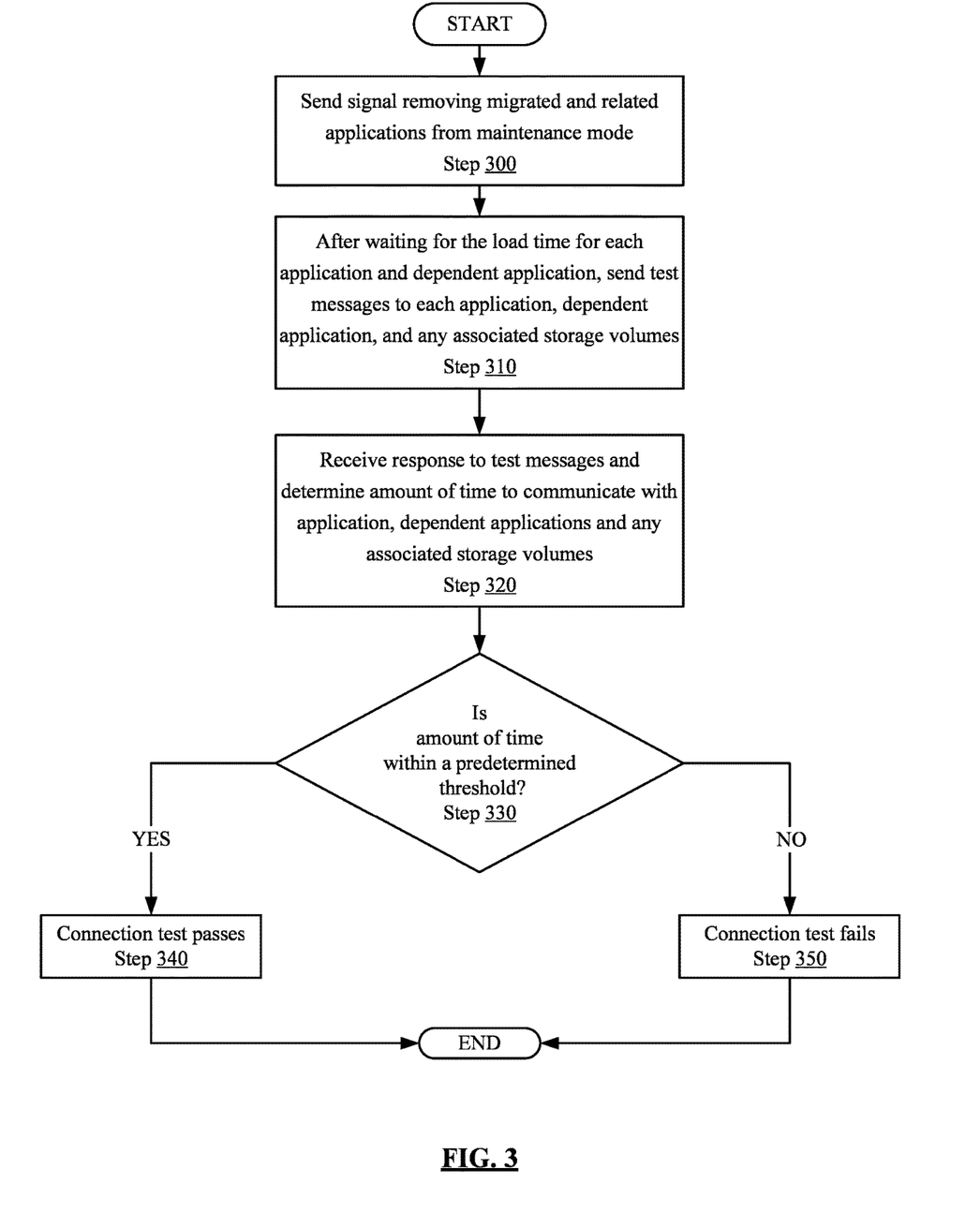
FIG. 3 shows a flowchart of a method for performing the connection check in accordance with one or more embodiments of the invention.

FIG. 3 shows a flowchart describing a method for performing a connection test in accordance with one or more embodiments disclosed herein. This method may be performed on its own or as part of Step 240 of the method of FIG. 2. The method may be performed by, for example, the checker (e.g., 120, FIG. 1) and/or any other part of the system shown in FIG. 1. Other components of the system illustrated in FIG. 1 and/or in addition to those shown in FIG. 1, may perform all, or a portion of the method of FIG. 3 without departing from the invention.

While FIG. 3 is illustrated as a series of steps, any of the steps may be omitted, performed in a different order, additional steps may be included, and/or any or all the steps may be performed in a parallel and/or partially overlapping manner without departing from the invention.

In Step 300, the checker (e.g., 120, FIG. 1) or other related components of the system, sends a signal or message to remove the applications from a maintenance mode or other mode where the applications and related applications are offline. The applications in one or more embodiments of the invention may be in a maintenance mode due to being migrated. Alternatively, the applications may be in a maintenance mode due to periodic or required maintenance, including when an application has previously failed a connection test. The application(s) may be offline or in a maintenance mode for other reasons without departing from the invention.

Once the checker (e.g., 120, FIG. 1) or related component in Step 300 sends the signal, the method proceeds to Step 310. The method waits a predetermined time for each application, dependent application, and/or dependent component to load. Once sufficient time has passed for the applications and/or components to load, the checker (e.g., 120, FIG. 1) sends a test message to each of the migrating applications (and/or the underlying computing devices that host them) as well as the related applications, components, and intermediary connections. In one or more embodiments of the invention, this is done by sending a message to the applications being migrated, which then forwards a message to each related application and component. Alternatively, in one or more embodiments of the invention, messages may be sent directly from the checker (e.g., 120, FIG. 1) to each application, component, and any intermediary connections and/or hops. The message in one or more embodiments of the invention may take the form of a ping. Other methods of sending messages to each application and/or component, as well as other forms of messages may be used without departing from the invention.

Once all the applications and related components receive the one or more messages from the checker (e.g., 120, FIG. 1), they send a response message. The response is received in Step 320 and the time it takes to communicate with the migrated application as well as each application or component that is related to it may be determined. Other information such as the number of network hops or other telemetry may be also received, which may be used for any future maintenance purposes. Once a sufficient time has passed to receive the response, the method proceeds to Step 330.

In Step 330, the checker (e.g., 120, FIG. 1) or other related component compares the amount of time it takes to communicate with the migrated application as well as each application or component with previous times and a predetermined threshold. The checker (e.g., 120, FIG. 1) in one or more embodiments calculates a difference between previous response times and the current response times and compares it with the predetermined threshold.

For example, in a non-limiting example, if an application has been migrated and took 20 ms during a pre-migration check to communicate with a database but during the post-migration check took 25 ms, the difference would be 5 ms equating to a 25% increase. The difference may be positive or negative and a different difference may be given for each application and component. In another non-limiting example, suppose an intermediary application that the migrated application is dependent on, during the pre-migration check takes 5 ms to respond but during the post-migration check takes 6 ms, then the difference for this component is 1 ms equating to a 20% increase.

In one or more embodiments of the invention, the threshold may be a predetermined difference in time or a percentage change in the amount of time. This threshold may be predetermined by a user, administrator, manufacturer, and/or other concerned party. The predetermined threshold may be a universal threshold for all such connection tests and/or migrations or could be set for the specific maintenance and/or migration currently being performed (for example it might be desirable to have a migration to a cloud environment to have a much higher threshold then a migration to a different host in the same information handling system).

If the difference in communication time for the applications being tested such as those that have been migrated, and all of the related applications and components is less than the threshold, the method proceeds to Step 340 where the connection test is considered to have passed or been successful, and the method ends. Otherwise, if the difference for any of the tested/migrated applications, related applications, and/or related components is greater than the threshold or no response was received at all in Step 330, the method proceeds to Step 350, where the migration is indicated/ considered to have failed or been unsuccessful and the method ends.

Using the previous example, where the difference is 5 ms and 1 ms. If the threshold is 30% increase, then the connection test would be considered to have passed. However, if the threshold is 21%, even though the intermediary application passed, because the response time for the database increased by 25%, the connection test would be considered to have failed. Other percentages or difference may be used without departing from the invention and the above values are only examples and not necessarily representative of real values.

Once either step 340 or 350 is complete, the method may end.

Example

Figure 4:
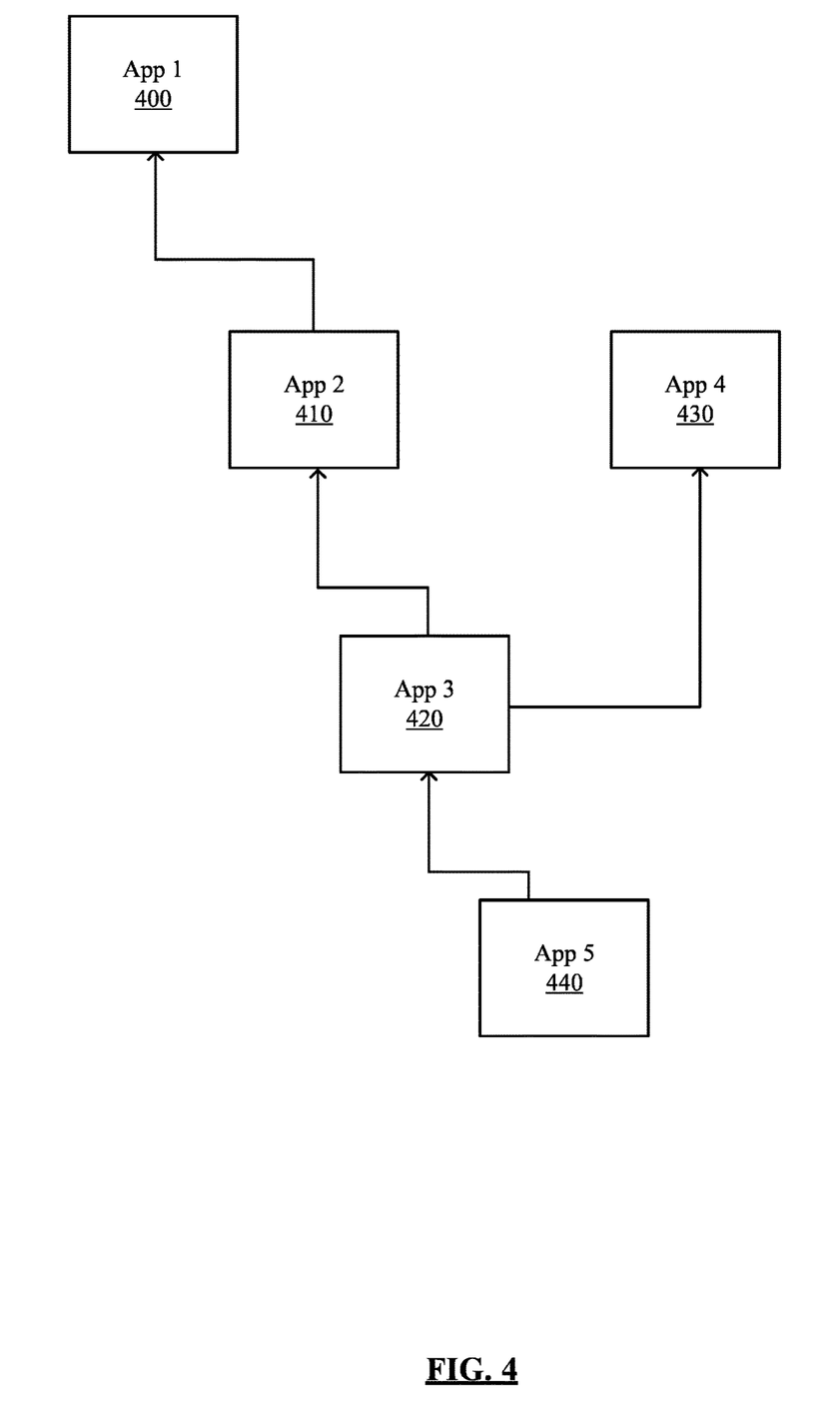
FIG. 4 shows an example of a system comprising a plurality of applications in accordance with one or more embodiments of the invention.

FIG. 4 shows an example of a system that includes a plurality of applications which are dependent on each other in order to better describe how the checker determines the optimized time for performing a connection test after performing a migration in accordance with the methods described above and shown in FIGS. 2A-3. While the example is shown with a simple number of relationships and organization for easier understanding, more or less applications, components and intermediary components/applications may be considered.

The example includes five applications (400-440), at least one of which (e.g., application 3 (420)) has been migrated. More or less applications may be mapped in this manner and the number of applications is only dependent on the number of applications that the migration described in the method of FIGS. 2A-3 is specified to be performed as specified by either a user, administrator, or other components of the checker or production hosts (e.g., 110A, 110N and 120, FIG. 1).

In the example shown in FIG. 4, assume that application 1 (400) and application 4 (430) have been placed in a maintenance mode due to the migration of application 3 (420). Because applications 1, 2, and 4 (400, 410, and 430) are dependent on at least application 3 (420), they have also all been placed in a maintenance mode. Application 5 (440) is not dependent on application 3 (420) and, as such, is not in maintenance mode.

Once the migration of application 3 is complete, the checker (e.g., 120, FIG. 1) or related component obtains system logs for applications 1-5 (400-440). The checker parses these system logs to determine average load times, peak usage times, and other pertinent times such as, but not limited to, average amount of time to resolve a repair ticket for the specific application. This information is analyzed by, e.g., a time series model which determines the optimized time for each application(s).

For example, application 1 (400) is found by the checker to need to be online by 12:30 PM UTC. Because application 1 (400) is dependent on applications 2, 3, and 5 (410, 420, and 440), the information regarding applications 2, 3, and 5 (410, 420, and 440) is obtained from the system logs and analyzed by the time series model to determine an optimized time to perform a connection test. Application 4 (430), however, is only dependent on applications 3 and 5 (420 and 440), and therefore only information for applications 3-5 (420-440) is obtained and analyzed by the time series model to determine an optimized time to perform the connection test of applications 4-5 (420-440).

Once the logs are parsed and analyzed, an optimized time is determined for each application. For example, application 1 (400) may have an optimized time of 10:15 AM UTC, while application 4 (430) may have an optimized time of 10:30 AM UTC. Because they are depending on common set of applications, the earlier time of 10:15 AM UTC may be selected to perform the check for all applications. Alternatively, a check may be performed at 10:15 AM UTC for the first set of applications (e.g., applications 1, 2, 3, 5) and 10:30 AM UTC for the second set of applications (e.g., application 4).

Once the time has been chosen, the checker performs the connection test as outlined above with regards to the method shown in FIG. 3. Messages or pings are sent to each of the applications 1-5 (400-440) and/or their underlying computational devices that host the applications. If, for example, the connection test finds that application 3 (420) is not responding, then applications 1-4 (400-430) are left in the maintenance mode and a user or administrator is alerted to the problem with application 3 (420). Alternatively, if only application 4 (430) is found to not be functioning, applications 1-3 (400-420) are brought online and only application 4 (430) is left in the maintenance mode.

Using the first example, where application 3 (420) does not respond/pass the connection test, after a predetermined amount of time which is preferentially early enough such that the applications that were left offline (e.g., applications 1-4 (400-430)) can be brought online prior to their peak usage, an additional connection test is performed to determine if the applications can be brought online. If during this time application 3 (420) has been repaired, and application 1-4 (400-430) pass the connection test, then applications 1-4 (400-430) are loaded and brought online. If, however application 3 (430) is still offline or another application has become non-responsive instead (e.g., application 2 (410)), then the checker waits another predetermined period of time, or the user or administrator can take a different action as appropriate.

Other methods of determining optimized times to perform one or more connection tests, may be considered in accordance with one or more embodiments of the invention based on criteria specified by a user or administrator as well as other components of the checker (e.g., 120, of FIG. 1) and/or production hosts (e.g., 110A and 110N of FIG. 1) in addition to the methods described above and with regards to the methods of FIGS. 2A-3. FIG. 4 is intended as an example only.

End Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many diverse types of computing devices exist, and the aforementioned input and output device(s) may take other forms.

In general, embodiments described above relate to methods, systems, and non-transitory computer readable mediums storing instructions for performing a connection test prior to bringing an application on-line. The method determines a best time to perform a connection test on an application that is currently off-line and at that time performs the connection test. The connection test is performed between the first application and those applications and components to which it is related. The connection test establishes whether prior to bringing the application on-line, for example after a migration, that the connections between it and all the applications and components that are related to it have been re-established with performance within a predetermined threshold.

In one or more embodiments, a component of the system, such as the above-described checker, messages each application or device associated with one or more applications, in order to determine that all related applications and/or components, such as storage devices, are communicating in a sufficient manner to provide a desired level of performance to a user of the one or more applications. If the desired level of performance (compared to pre-migration) is not achieved, then a user or administrator may be alerted to perform necessary interventions to restore the one or more applications or related components of any computing devices hosting the one or more applications. This ensures that the application will be restored and functioning prior to a peak usage, so that a user does not encounter significant downtime and/or reduced performance.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments may be devised which do not depart from the scope of embodiments as disclosed herein. Accordingly, the scope of embodiments described herein should be limited only by the attached claims.

What is claimed is:

1. A computer-implemented method for verifying that an application is active, the method comprising:
    after migrating of the application from a first production host to a second production host, identifying, by a checking system, the application, related components and related applications, wherein the related components comprise storage locations and network hops of which the application is dependent and the related applications comprise dependent applications that depend on the application, wherein at least one of the related applications is offline;
    accessing, by the checking system, data from system logs to determine a typical load time for the application, peak use times of the application, and idle times of the application;
    determining, using the data from the system logs, an optimal time for performing a connection test between the application, related components and related applications;
    performing, by the checking system, the connection test, during the optimal time, wherein performing of the connection test comprises:
        sending, by the checking system, a message to the application, related components and related applications;
        receiving, by the checking system, a response message from the application, related components and related applications;
        comparing, by the checking system, amounts of time for the response messages to be received from the application, related components and related applications to a predetermined threshold;
        making a first determination that the connection test has failed based on the amounts of time for the response messages to be received from the application, related components and related applications exceeding the predetermined threshold;
        alerting, based on the first determination, a user that the connection has failed;
        making a second determination that the connection test failed early enough that the at least one of the related applications that was offline can be brought online prior to its peak usage;
        loading, in response to the second determination, by the checking system, the at least one of the related applications; and
        bringing, in response to the loading, the at least one of the related applications online.

2. The computer-implemented method of claim 1, wherein the method further comprises identifying at least one storage location that is related to the application and performing the connection test further comprises testing at least the connection between the storage location and the application.

3. The computer-implemented method of claim 1, wherein determining, using the data from the system logs, the optimal time for performing the connection test comprises determining a load time for the application and the related applications.

4. The computer-implemented method of claim 1, wherein determining the optimal time for performing the connection test comprises determining, using the data from the system logs, a peak use time for both the application and the related applications.

5. The computer-implemented method of claim 1, wherein the method further comprises performing a second connection test between the application, related components and related applications-after a predetermined period of time has passed after alerting the user when the connection test failed.

6. A non-transitory computer readable medium comprising computer readable program code, which when executed by a computer processor enables the computer processor to perform a method for verifying that an application is active, the method comprising:
  after migrating the application from a first production host to a second production host, identifying by a checking system, the application, related components and related applications, wherein the related components comprise storage locations and network hops of which the application is dependent and the related applications comprise dependent applications that depend on the application, wherein at least one of the related applications is offline;
  accessing, by the checking system, data from system logs to determine a typical load time for the application, peak use times of the application, and idle times of the application;
  determining, using the data from the system logs, an optimal time for performing a connection test between the application, related components and related applications;
  performing, by the checking system, the connection test, during the optimal time, wherein performing of the connection test comprises:
    sending, by the checking system, a message to the application, related components and related applications;
    receiving, by the checking system, a response message from the application, related components and related applications;
    comparing, by the checking system, amounts of time for the response messages to be received from the application, related components and related applications to a predetermined threshold;
    making a first determination that the connection test has failed based on the amounts of time for the response messages to be received from the application, related components and related applications exceeding the predetermined threshold;
    alerting, based on the first determination, a user that the connection test has failed;
    making a second determination that the connection test failed early enough that the at least one of the related applications that was offline can be brought online prior to its peak usage;
    loading, in response to the second determination, by the checking system, the at least one of the related applications; and
    bringing, in response to the loading, the at least one of the related applications online.

7. The non-transitory computer readable medium of claim 6, wherein the method further comprises identifying at least one storage location that is related to the application and performing the connection test further comprises testing at least the connection between the storage location and the application.

8. The non-transitory computer readable medium of claim 6, wherein determining, using the data from the system logs, the optimal time for performing the connection test comprises determining a load time for the application and the related applications.

9. The non-transitory computer readable medium of claim 6, wherein determining the optimal time for performing the connection test comprises determining, using the data from the system logs, a peak use time for both the application and the related applications.

10. The non-transitory computer readable medium of claim 6, wherein the method further comprises performing a second connection test between the application, related components and related applications after a predetermined period of time has passed after alerting the user when the connection test failed.

11. A system comprising:
  a first production host that hosts a plurality of first applications;
  a second production host that hosts a plurality of second applications;
  a checking system that performs checks on offline applications prior to bring the offline applications online which comprises:
  at least one processor;
  a storage device; and
  at least one memory that includes instructions, which when executed by the processor, perform a method for verifying an application is active, the method comprising:
    after migrating the application from the first production host to the second production host, identifying the application, related components and related applications, wherein the related components comprise storage locations and network hops of which the application is dependent and the related applications comprise dependent applications that depend on the application, wherein at least one of the related applications is offline;
    accessing data from system logs to determine a typical load time for the application, peak use times of the application, and idle times of the application;
    determining, using the data from the system logs, an optimal time for performing a connection test between the application, related components and related applications;
    performing the connection test, during the optimal time and using the checking system, wherein performing of the connection test comprises:
      sending a message to the application, related components and related applications;
      receiving a response message from the application, related components and related applications;
      comparing amounts of time for the response messages to be received from the application, related components and related applications to a predetermined threshold; and
      making a first determination that the connection test has failed based on the amounts of time for the response messages to be received from the application, related components and related applications exceeding the predetermined threshold;
      alerting, based on the first determination, a user that the connection test has failed; and
      making a second determination that the connection test failed early enough that the at least one of the related applications that was offline can be brought online prior to its peak usage;
      loading, in response to the second determination, by the checking system, the at least one of the related applications; and
      bringing, in response to the loading, the at least one of the related applications online.

12. The system of claim 11, wherein the method further comprises identifying at least one storage location that is related to the application and performing the connection test further comprises testing at least the connection between the storage location and the application.

13. The system of claim 11, wherein determining, using the data from the system logs, the optimal time for performing the connection test comprises determining a load time for the application and the related applications.

* * * * *